358-69. OR 3,234,324 SR

SEARCH ROOM

T 6532

Feb. 8, 1966 C. E. MUTSCHLER 3,234,324

COLOR TELEVISION RECEIVER EMPLOYING BOTH AMBIGUOUS AND UNAMBIGUOUS INDEX SIGNALS

Filed Aug. 10, 1960

INVENTOR.
CARL E. MUTSCHLER
BY
Fordyce A. Bothwell
ATTORNEY

United States Patent Office 3,234,324

Patented Feb. 8, 1966

3,234,324

COLOR TELEVISION RECEIVER EMPLOYING BOTH AMBIGUOUS AND UNAMBIGUOUS INDEX SIGNALS

Carl E. Mutschler, Warminster, Pa., assignor, by mesne assignments, to Philco Corporation, Philadelphia, Pa., a corporation of Delaware Filed Aug. 10, 1960, Ser. No. 48,755
14 Claims. (Cl. 178—5.4)

Figures 1, 2, 3:
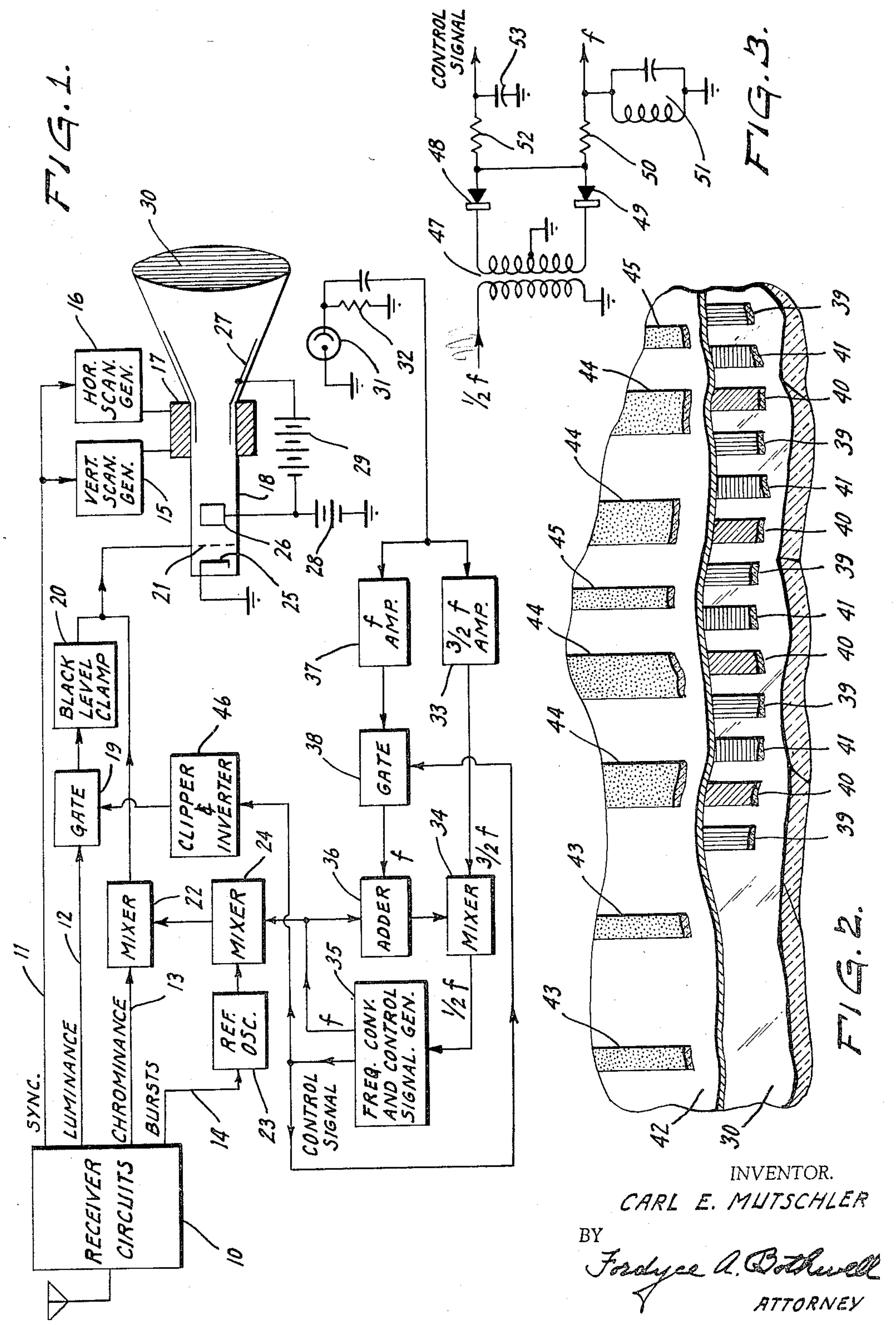

This invention relates to color television receivers and more particularly to receivers of the type employing an index-type cathode ray tube which, in addition to producing the color image, produces an index signal indicative of the instantaneous position of the electron beam, such signal being utilized to effect proper coordination at each instant between modulation and position of said beam, which is essential for proper color rendition. Color television receivers of this type are now well known in the art, and therefore the following brief discussion thereof will suffice for the purpose of this specification.

First, with respect to the cathode ray tube, the screen thereof comprises successive sets of light-emissive elements, the elements of each set being emissive of light of different primary colors in response to electron impingement. The screen further comprises means for producing the desired index signal, e.g. by secondary electron emission or by light emission. Preferably, the colored light-emissive elements are in the form of stripes extending transversely to the direction of line scanning and comprising successive triplets, each triplet comprising phosphor stripes emissive of light of three primary colors such as red, green and blue. The means for producing the index signal preferably comprises stripe-like elemental areas in parallel relation to the colored light-producing stripes and positionally related thereto so that the phase of the index signal is indicative of the position of the electron beam in relation to the triplets.

Next with respect to the reproduction of the color image, it should be borne in mind that the now-standard composite color television signal comprises the luminance signal, the chrominance signal which is transmitted as amplitude and phase modulation of a subcarrier in the upper portion of the video band, and the color reference signal consisting of bursts of the unmodulated subcarrier occurring during the blanking intervals immediately following the horizontal synchronizing pulses. In a receiver of the type here involved, the color writing frequency, usually about 6 mc. is the nominal rate at which the electron beam traverses the color triplets, i.e. the number of triplets traversed per second. For proper reproduction of the color image, it is necessary to produce a color writing signal at the writing frequency containing the color information of the chrominance signal and it is necessary to effect proper coordination at each instant between modulation and position of said beam according to the indexing information of the index signal.

In a color television receiver of the type briefly discussed above, the index signal may be produced by providing an index stripe for each of the color triplets, in which case the index signal has a frequency corresponding to the rate of beam traversal of the triplets. While such a signal is "unambiguous" in that its phase at a particular instant is necessarily indicative of beam position for a certain one color, it is subject to phase error when the color component of the beam modulation is high, i.e. when the ratio of chrominance to luminance is high, due to highly saturated colors of the object or scene being televised. On the other hand, an "ambiguous" index signal, i.e. a signal whose frequency is different from the color writing frequency, while it is phase invariant in the presence of strong beam modulating color signal, is not necessarily indicative at a particular instant of beam position for a certain one color but may be indicative of beam position for any one of the several colors.

In a copending application of F. P. Keiper, Jr. et al., Serial No. 797,684, filed March 6, 1959, now Patent No. 3,041,392 issued June 26, 1962, assigned to the assignee of the present application, there is disclosed and claimed a system in which an ambiguous index signal is produced whose frequency bears a fractional relation to the color writing frequency, and a frequency conversion loop is employed to convert the frequency of said signal to the color writing frequency. The conversion loop is started in correct phase by an unambiguous index signal at the beginning of each line scan, thus resolving the ambiguity of the ambiguous index signal.

It has been found, however, that in such a system the luminance or brightness modulation of the electron beam during the initial portion of the line scan tends to introduce ambiguity into the index signal which is intended to be unambiguous. This tends to defeat the purpose of the latter signal and thus tends to affect adversely the phase of the color writing signal.

The principal object of the present invention is to overcome this objection.

In accordance with this invention the luminance or brightness signal is effectively removed or suppressed during the initial portion of the line scan so that the beam intensity is substantially constant during that portion. This prevents the introduction of ambiguity into the unambiguous signal which is therefore enabled to perform its ambiguity-resolving function.

The invention may be fully understood from the following detailed description with reference to the accompanying drawing wherein FIG. 1 is a block diagram of a color television receiver including an embodiment of this invention;

FIG. 2 is a fragmentary perspective view of one form of screen structure which may be employed in the cathode ray tube of FIG. 1; and FIG. 3 is a diagrammatic illustration of a frequency converter and control signal generator which may be employed in the receiver of FIG. 1.

Referring first to FIG. 1, block 10 represents the conventional receiver circuits by which the components of an incoming color television signal are derived. These components comprise the deflection synchronizing components derived at output connection 11, the luminance or brightness derived at output connection 12, the chrominance component derived at output connection 13, and the bursts derived at output connection 14. The deflection synchronizing components are supplied to the vertical and horizontal scanning circuits represented at 15 and 16 which supply deflection currents to the yoke 17 associated with the cathode ray tube 18. The luminance or brightness component is supplied through gate 19 (whose purpose will be described later) and the usual black level clamp 20 to the control grid 21 of the cathode ray tube 18. The chrominance component, which comprises the aforementioned modulated subcarrier, is supplied to a heterodyne mixer 22 for derivation of the color writing signal which in turn is supplied to the control grid 21 of the cathode ray tube 18. The bursts, each of which comprises a number of cycles of the unmodulated subcarrier occurring during each horizontal blanking interval, are supplied to a reference oscillator 23 which supplies to a heterodyne mixer 24 a continuous color reference signal having the frequency of the subcarrier.

As hereinbefore stated, the nominal frequency of the color writing signal may be 6 mc. The frequency of the color subcarrier may be 3.58 mc. In the system illustrated, it is desired to supply to mixer 24 an unambiguous index signal, i.e. a signal having the nominal color writing frequency and whose phase at a particular instant is indicative of beam position with respect to the color stripes, and it is further desired that the index signal shall not be misphased by high color signal modulation of the electron beam within the cathode ray tube 18. The mixer 24 receives the color reference signal having a frequency of 3.58 mc. and the derived index signal having a nominal frequency of 6 mc., and by additive heterodyne action the mixer 24 produces a resultant signal having a frequency of 9.58 mc. and phased according to the indexing information of the index signal. This resultant signal is supplied to mixer 22 which also receives the 3.58 mc. chrominance signal. By subtractive heterodyne action the mixer 22 produces the 6 mc. color writing signal which contains the color information of the chrominance signal and is phased according to the indexing information of the index signal.

Referring now more particularly to the cathode ray tube 18, in addition to the grid 21 it comprises the usual cathode 25 and at least one anode. In the form shown, it comprises a focusing anode 26, and an accelerating anode 27 which may consist of a conductive coating on the inner wall of the tube. Suitable operating voltages may be supplied from the receiver's power supply, the batteries 28 and 29 being conveniently representative of the voltage sources.

The faceplate 30 may serve as a supporting base for the screen elements, as hereinafter described, it being understood that the cathode ray tube is of the index type. Preferably, the cathode ray tube is of the photo-index type, i.e. it produces index signal by light emission from index elements of the screen. The index elements may be formed of fluorescent material such as zinc oxide which emits non-visible light in response to electron impingement. The photo-cell 31 receives the light pulses and produces the index signal across resistor 32. Such production of the index signal is well known, as shown for example in U.S. Patent No. 2,749,449, issued June 5, 1956 to W. E. Bradley et al. Of course, it will be understood that the index signal may be produced in any other suitable manner, e.g. by secondary electron emission as well known.

As hereinbefore stated, an unambiguous index signal derived from the screen structure of the cathode ray tube, while normally providing the proper phase reference indicative of beam position with respect to the color stripes, is subject to misphasing whenever the color component of the beam modulation is high; and it has been proposed previously to overcome this objection by deriving an index signal from an ambiguous signal and by utilizing an unambiguous signal to effect correct phasing of the index signal. In describing the index signal-deriving portion of the system shown in FIG. 1, it will be convenient to designate the nominal color writing frequency by the letter *f*.

In the system of FIG. 1, an ambiguous signal, which may have a frequency of $\frac{3}{2}f$, is supplied by the cathode ray tube as hereinafter described and is selected by tuned amplifier 33. This signal is supplied to a count-down loop comprising a heterodyne mixer 34, a frequency converter 35 and an adder 36. By subtractive heterodyne action of mixer 34, the signal $\frac{3}{2}f$ from amplifier 33 is converted to a signal $\frac{1}{2}f$ which is converted by converter 35 to a signal of frequency *f*. In order to start the count-down loop in correct phase at the beginning of each line scan, an unambiguous signal of frequency *f* is derived as hereinafter described and is selected by tuned amplifier 37 and is supplied to the adder 36 through a gate 38 whose purpose will be described later.

Referring now to FIG. 2, there is shown a portion of one form of screen structure for producing the unambiguous and ambiguous signals *f* and $\frac{3}{2}f$ in the system of FIG. 1. In this screen structure, as in certain prior screen structures for index-type cathode ray tubes, the colored light-emissive phosphor stripes and the index stripes are separated by an electron-permeable light-reflecting film or layer which may be composed of aluminum. It will be understood that in FIG. 2 the stripes are greatly exaggerated as to width and thickness, as in actual practice they are quite fine, being in the nature of lines.

In the illustrated structure the colored light-emissive phosphor stripes are placed on the image-forming area of the rear surface of the faceplate 30. These stripes comprise red light-emissive stripes 39, green light-emissive stripes 40 and blue light-emissive stripes 41. Thus there are successive color triplets each of whose stripes successively emit light in the respective primary colors. A thin aluminum film 42 is placed over said stripes, and the index stripes are placed on the aluminum film.

Referring particularly to the index structure, it will be noted that there are index stripes 43 (only two shown) on the left-hand marginal area of the screen ahead of the image-forming area as regards impingement of the electron beam, and there are also index stripes 44 having portions overlying the green light-emissive phosphor stripes. Stripes 43 and the said portions of stripes 44 have a spacing such that they produce, in response to electron beam impingement, the unambiguous signal *f*.

It will also be noted that stripes 44 have portions overlying spaces between the color stripes and there are also stripes 45 (only two shown) overlying spaces between the color stripes. The latter portions of stripes 44 and the stripes 45 have a spacing such that they produce in response to electron beam impingement, the ambiguous signal $\frac{3}{2}f$. This is because they overlie alternate ones of the spaces between the color stripes.

The illustrated portion of the screen structure is the portion which is scanned by the electron beam during the first part of each line scan, and at least part of the illustrated structure is not visible to the viewer. Thus in a cathode ray tube having a screen with curved side portions which are hidden from view, at least part of the illustrated structure will be a hidden side portion.

Referring again to FIG. 1 and disregarding for the moment the blocks 19, 38 and 46, as the electron beam commences a line scan the two signals *f* and $\frac{3}{2}f$ are produced to start the count-down loop which is intended to be started in correct phase by the unambiguous signal *f*, and the signal $\frac{3}{2}f$ continues to drive the count-down loop throughout the line scan. The count-down loop supplies to the mixer 24 an unambiguous index signal which has the nominal color writing frequency and whose phase at a particular instant is intended to be indicative of beam position for a certain one color. As hereinbefore stated, it was found that in the operation of such a system the luminance or brightness modulation of the electron beam at the beginning of each line scan tends to produce ambiguity in the signal *f* which is intended to be unambiguous. This in turn tends to affect adversely the phase of the color writing signal.

In accordance with the present invention, this objection is overcome by effectively removing the luminance or brightness modulation at the beginning of each line scan when it is not needed, since the portion of the screen then being scanned is not visible to the viewer. In the system of FIG. 1, the gate 19 is initially closed so that the luminance component cannot pass through it, and this gate is opened by a control signal which is produced in the count-down loop as hereinafter described. The gate 19 may comprise a vacuum tube which is biased to cut-off and which is rendered conductive by a positive signal supplied to its control grid. Since the control signal produced in the count-down loop is negative, it is passed through a clipper and inverter 46 before being supplied to gate 19.

Thus in a color television receiver employing an index type cathode ray tube wherein an ambiguous index signal is produced and an unambiguous index signal is also produced at the beginning of each line scan and is utilized to resolve the ambiguity of the ambiguous signal, and wherein the presence of luminance or brightness beam modulation at the beginning of each line scan tends to introduce ambiguity into said unambiguous signal, the present invention provides means for effectively removing or suppressing said modulation at the beginning of each line scan to prevent the introduction of ambiguity into said unambiguous signal.

The frequency converter and control signal generator 35, wherein the above-mentioned control signal is produced, may be of the form shown in FIG. 3. The signal ½ $f$ from mixer 34 is supplied through transformer 47, whose secondary winding is center-tapped to ground, to diodes 48 and 49 which are connected through resistor 50 to tuned circuit 51 which is tuned to the frequency $f$. Through frequency doubling action involving alternate conduction of diodes 48 and 49, the signal $f$ is derived from across the tuned circuit 51.

The aforementioned control signal is produced by integrating means comprising resistor 52 and capacitor 53 connected to diodes 48 and 49. The negative control signal derived from across capacitor 53 is inverted in inverter 46, and the inverted signal opens the gate 19.

In the system of FIG. 1, if the signal $\frac{3}{2} f$ should disappear for any reason, such as screen blemishes, noise pulses, etc., no color writing signal would be supplied to the cathode ray tube. If the signal $f$ were produced only at the beginning of each line scan, upon reappearance of the signal $\frac{3}{2} f$ the count-down loop would not be started again until the beginning of the next line scan. However, in the illustrated system the screen structure of the cathode ray tube 18 is such as to produce the signal $f$ throughout each line scan, and the gate 38 is provided and is controlled by the aforementioned control signal. The purpose of the gate 38 is to gate off the signal $f$ after the count-down loop has been started in correct phase. This gate may comprise a vacuum tube having at least triode elements, whose grid is driven to cut-off whenever a negative gating signal is supplied thereto.

In operation of the system shown in FIG. 1, at the beginning of each line scan gate 19 is closed and gate 38 is open. The signal $f$ passing through gate 38 starts the count-down loop in correct phase without the luminance component being present to interfere. Upon starting of the count-down loop, the control signal produced therein opens gate 19 and closes gate 38. The signal $\frac{3}{2} f$ continues to drive the count-down loop throughout the line scan.

If the signal $\frac{3}{2} f$ should disappear at any time the count-down loop would stop, and gate 19 would close and gate 38 would open. Immediately upon reappearance of the signal $\frac{3}{2} f$, the count-down loop would be restarted in correct phase, and gate 19 would be opened and gate 38 would be closed.

While a preferred embodiment of the invention has been illustrated and described, it is to be understood that the invention is not limited thereto but contemplates such modifications and further embodiments as may occur to those skilled in the art.

I claim:

1. In a color television receiver employing an index type cathode ray tube wherein colored light-emissive elements and index elements are scanned by an electron beam in successive line scans, means for producing an index signal which is phase invariant in the presence of strong chrominance modulation of said beam but which is not necessarily indicative at a particular instant of beam position relative to elements emissive of light of one color, means for producing at least at the beginning of each line scan a second index signal which is necessarily indicative at a particular instant of beam position relative to elements emissive of light of one color, means for deriving from said signals an index signal of desired frequency and phase, the presence of luminance or brightness beam modulation at the beginning of each line scan tending to affect adversely the phase of said derived index signal, and means for effectively removing said modulation at the beginning of each line scan to prevent adverse effect thereof upon said derived index signal.

2. In a color television receiver employing an index type cathode ray tube wherein colored light-emissive elements and index elements are scanned by an electron beam in successive line scans, means for producing an index signal which is phase invariant in the presence of strong chrominance modulation of said beam but which is not necessarily indicative at a particular instant of beam position relative to elements emissive of light of one color, means for producing at least at the beginning of each line scan a second index signal which is necessarily indicative at a particular instant of beam position relative to elements emissive of light of one color, means for deriving from said signals an index signal of desired frequency and phase, the presence of luminance or brightness beam modulation at the beginning of each line scan tending to affect adversely the phase of said derived index signal, means for suppressing the luminance or brightness signal at the beginning of each line scan to prevent adverse effect thereof upon said derived index signal, means for producing a control signal, and means for utilizing said control signal to render said suppressing means ineffective.

3. In a color television receiver employing an index type cathode ray tube wherein successive sets of colored light-emissive elements are scanned by an electron beam at the color writing frequency, means for producing an index signal of different frequency which is phase invariant in the presence of strong chrominance modulation of said beam but which is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said signals an index signal of desired frequency and phase, the presence of luminance or brightness beam modulation at the beginning of each line scan tending to affect adversely the phase of said derived index signal, and means for effectively removing said modulation at the beginning of each line scan to prevent adverse effect thereof upon said derived index signal.

4. In a color television receiver employing an index type cathode ray tube wherein successive sets of colored light-emissive elements are scanned by an electron beam at the color writing frequency, means for producing an index signal of different frequency which is phase invariant in the presence of strong chrominance modulation of said beam but which is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said signals an index signal of desired frequency and phase, the presence of luminance or brightness beam modulation at the beginning of each line scan tending to affect adversely the phase of said derived index signal, means for suppressing the luminance or brightness signal at the beginning of each line scan to prevent adverse effect thereof upon said derived index signal, means for producing a control signal, and means for utilizing said control signal to render said suppressing means ineffective.

5. In a color television receiver employing an index type cathode ray tube wherein successive sets of colored light-emissive elements are scanned by an electron beam at the color writing frequency, means for producing an index signal having a frequency which is fractionally related to the color writing frequency, which signal is phase invariant in the presence of strong chrominance modulation of said beam but is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said signals an index signal of desired frequency and phase, the presence of luminance or brightness beam modulation at the beginning of each line scan tending to affect adversely the phase of said derived index signal, and means for effectively removing said modulation at the beginning of each line scan to prevent adverse effect thereof upon said derived index signal.

6. In a color television receiver adapted to receive a composite color television signal from which luminance and chrominance signals are derived, a cathode ray tube of the index type wherein successive sets of colored light-emissive elements are scanned by an electron beam at the color writing frequency, means for producing an index signal of different frequency which is phase invariant in the presence of strong chrominance modulation of said beam but which is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said index signals a resultant index signal having the frequency and phase of said second signal, means for producing a color writing signal containing the color information of said chrominance signal and having the frequency and phase of said resultant index signal, the presence of said luminance signal at the beginning of each line scan tending to affect adversely the phase of said color writing signal, and means for suppressing said luminance signal at the beginning of each line scan to prevent adverse effect thereof upon said color writing signal.

7. In a color television receiver adapted to receive a composite color television signal from which luminance and chrominance signals are derived, a cathode ray tube of the index type wherein successive sets of colored light-emissive elements are scanned by an electron beam at the color writing frequency, means for producing an index signal of different frequency which is phase invariant in the presence of strong chrominance modulation of said beam but which is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said index signals a resultant index signal having the frequency and phase of said second signal, means for producing a color writing signal containing the color information of said chrominance signal and having the frequency and phase of said resultant index signal, the presence of said luminance signal at the beginning of each line scan tending to affect adversely the phase of said color writing signal, means for suppressing said luminance signal at the beginning of each line scan to prevent adverse effect thereof upon said color writing signal, means for producing a control signal, and means for utilizing said control signal to render said suppressing means ineffective.

8. In a color television receiver adapted to receive a composite color television signal from which luminance and chrominance signals are derived, a cathode ray tube of the index type wherein successive sets of colored light-emissive elements are scanned by an electron beam at the color writing frequency, means for producing an index signal having a frequency which is fractionally related to the color writing frequency, which signal is phase invariant in the presence of strong chrominance modulation of said beam but is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said index signals a resultant index signal having the frequency and phase of said second signal, means for producing a color writing signal containing the color information of said chrominance signal and having the frequency and phase of said resultant index signal, the presence of said luminance signal at the beginning of each line scan tending to affect adversely the phase of said color writing signal, and means for suppressing said luminance signal at the beginning of each line scan to prevent adverse effect thereof upon said color writing signal.

9. In a color television receiver adapted to receive a composite color television signal from which are derived a luminance signal, a chrominance signal and a color reference signal, a cathode ray tube of the index type wherein successive sets of colored light-emissive elements are scanned by an electron beam at the color writing frequency, means for supplying said luminance signal to said tube to modulate said beam, means for producing an index signal having a frequency different from said color writing frequency which is phase invariant in the presence of strong chrominance modulation of said beam but which is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said index signals a resultant index signal having the frequency and phase of said second signal, heterodyne mixer means for producing a color writing signal from the derived index signal and from the color reference and chrominance signals, means for supplying said color writing signal to said tube to modulate said beam, the presence of luminance beam modulation at the beginning of each line scan tending to affect adversely the phase of the derived index signal and the color writing signal, and means for suppressing said luminance signal at the beginning of each line scan to prevent the said adverse effect.

10. In a color television receiver adapted to receive a composite color television signal from which are derived a luminance signal, a chrominance signal and a color reference signal, a cathode ray tube of the index type wherein successive sets of colored light-emissive elements are scanned by an electron beam at the color writing frequency, means for supplying said luminance signal to said tube to modulate said beam, means for producing an index signal having a frequency different from said color writing frequency which is phase invariant in the presence of strong chrominance modulation of said beam but which is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said index signals a resultant index signal having the frequency and phase of said second signal, heterodyne mixer means for producing a color writing signal from the derived index signal and from the color reference and chrominance signals, means for supplying said color writing signal to said tube to modulate said beam, the presence of luminance beam modulation at the beginning of each line scan tending to affect adversely the phase of the derived index signal and the color writing signal, means for suppressing said luminance signal at the beginning of each line scan to prevent the said adverse effect, means for producing a control signal, and means for utilizing said control signal to render said suppressing means ineffective.

11. In a color television receiver adapted to receive a composite color television signal from which are derived a luminance signal, a chrominance signal and a color reference signal, a cathode ray tube of the index type wherein successive sets of colored light-emissive elements are scanned by an electron beam at the color writing frequency, means for supplying said luminance signal to said tube to modulate said beam, means for producing an index signal having a frequency which is fractionally related to the color writing frequency, which signal is phase invariant in the presence of strong chrominance modulation of said beam but is not necessarily indicative at a particular instant of beam position relative to elements emissive of light of one color, means for producing at least at the beginning of each line scan a second index signal having the color writing frequency which is necessarily indicative at a particular instant of beam position relative to elements emissive of light of one color, frequency-conversion means for deriving from said index signals a resultant index signal having the frequency and phase of said second signal, heterodyne mixer means for producing a color writing signal from the derived index signal and from the color reference and chrominance signals, means for supplying said color writing signal to said tube to modulate said beam, the presence of luminance beam modulation at the beginning of each line scan tending to affect adversely the phase of the derived index signal and the color writing signal, and means for suppressing said luminance signal at the beginning of each line scan to prevent the said adverse effect.

12. In a color television receiver adapted to receive a composite color television signal from which luminance and chrominance signals are derived, a cathode ray tube of the index type wherein successive sets of colored light-emissive elements are scanned by an electron beam, a luminance channel through which said luminance signal is supplied to said tube to modulate said beam, a chrominance channel through which said chrominance signal is supplied to said tube to modulate said beam, means for producing an index signal which is phase-invariant in the presence of strong chrominance modulation of said beam but which is not necessarily indicative at a particular instant of beam position relative to elements emissive of light of one color, means for producing at least at the beginning of each line scan a second index signal which is necessarily indicative at a particular instant of beam position relative to elements emissive of light of one color, means for deriving from said index signals a resultant index signal of desired frequency and phase, means for utilizing said derived index signal to effect proper coordination at each instant between chrominance modulation and position of said beam, a gate in said luminance channel, and means for controlling said gate so that it is closed at the beginning of each line scan and is opened to permit passage of said luminance signal, whereby to prevent luminance modulation of said beam at the beginning of each line scan which would tend to affect adversely the phase of said derived index signal.

13. In a color television receiver adapted to receive a composite color television signal from which luminance and chrominance signals are derived, a cathode ray tube of the index type wherein successive sets of colored light-emissive elements are scanned by an electron beam at the color writing frequency, a luminance channel through which said luminance signal is supplied to said tube to modulate said beam, a chrominance channel through which said chrominance channel is supplied to said tube to modulate said beam, means for producing an index signal of a frequency different from said color writing frequency and which is phase-invariant in the presence of strong chrominance modulation of said beam but which is not necessarily indicative at a particular instant of beam position relative to elements emissive of light of one color, means for producing at least at the beginning of each line scan a second index signal having the color writing frequency and which is necessarily indicative at a particular instant of beam position relative to elements emissive of light of one color, frequency-conversion means for deriving from said index signals a resultant index signal of desired frequency and phase, means for utilizing said derived index signal to effect proper coordination at each instant between chrominance modulation and position of said beam, a gate in said luminance channel which is closed at the beginning of each line scan, and means for deriving from said frequency conversion means and supplying to said gate a control signal which opens the gate, the initial closure of said gate preventing luminance modulation of said beam at the beginning of each line scan which would tend to affect adversely the phase of said derived index signal.

14. In a color television receiver adapted to receive a composite color television signal from which luminance and chrominance signals are derived, a cathode ray tube of the index type wherein successive sets of colored light-emissive elements are scanned by an electron beam at the color writing frequency, a luminance channel through which said luminance signal is supplied to said tube to modulate said beam, a chrominance channel through which said chrominance signal is supplied to said tube to modulate said beam, means for producing an index signal of a frequency different from said color writing frequency and which is phase-invariant in the presence of strong chrominance modulation of said beam but which is not necessarily indicative at a particular instant of beam position relative to elements emissive of light of one color, means for producing a second index signal having the color writing frequency and which is necessarily indicative at a particular instant of beam position relative to elements emissive of light of one color, frequency-conversion means for deriving from said index signals a resultant index signal of desired frequency and phase, a first gate through which said second index signal is supplied to said frequency-conversion means, means for utilizing said derived index signal to effect proper coordination at each instant between chrominance modulation and position of said beam, a second gate in said luminance channel which is closed at the beginning of each line scan, means for deriving a control signal from said frequency-conversion means, means to effect closure of said first gate by said control signal, and means to effect opening of said second gate by said control signal, the initial closure of said second gate preventing luminance modulation of said beam at the beginning of each line scan which would tend to affect adversely the phase of said derived index signal.

References Cited by the Examiner

UNITED STATES PATENTS

| | | | |
|---|---|---|---|
| 2,778,971 | 1/1957 | Sunstein | 178—5.4 |
| 2,945,087 | 7/1960 | Graham et al. | 178—5.4 |

DAVID G. REDINBAUGH, *Primary Examiner.*

NEWTON LOVEWELL, ROBERT SEGAL, *Examiners.*